Figure 1:
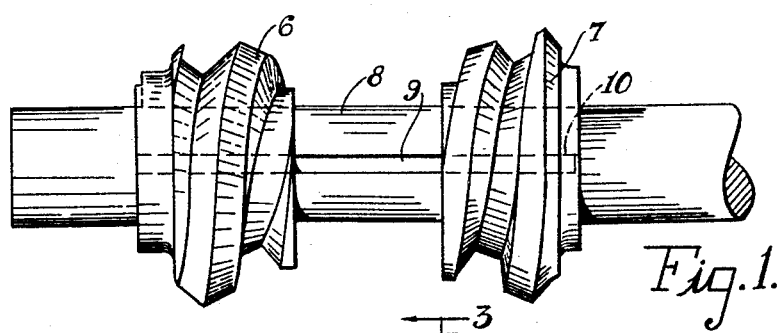

March 3, 1931.  J. N. KELLY  1,794,907

WORM AND GEAR

Filed July 19, 1929

INVENTOR,
Joseph N. Kelly
BY Howard S. Smith
His ATTORNEY

Patented Mar. 3, 1931

1,794,907

UNITED STATES PATENT OFFICE

JOSEPH N. KELLY, OF DAYTON, OHIO

WORM AND GEAR

Application filed July 19, 1929. Serial No. 379,452.

This invention relates to new and useful improvements in worm and gears.

It is one of the principal objects of my invention to provide a worm which will contact with all the teeth in the gear through a greatly extended angle, thus reducing wear on the bearings supporting the gear.

Where the point of contact is on one face, the thrust is in one continuous direction. But diversity of points of contact between the worm and gear insures ease of operation, durability and ample means of adjustment. Production is also under a method which is simple and fully in line with approved practice.

To produce a worm and gear correctly, the limits of tolerance must be held very close, which is difficult in mass production. To overcome this difficulty such expedients as eccentric bushings and adjustable bearings have been employed for the purpose of effecting contact on the pitch line of the two members.

Assuming that the worm and gear has been accurately made, the zone of tooth contact between the two members is more or less limited, embracing approximately 1½ to 3 threads of the worm and the same number of teeth in the gear. The work or load is distributed in turn to all the teeth in the gear, but it is imposed continuously on the few worm threads in contact therewith; and when wear occurs, there is no means of compensation or adjustment.

The limited area of tooth contact between the worm and gear being a fixed condition, the wear on the bearings supporting the gear becomes excessive, and not easily overcome. This applies to the present, or accepted type of worm and gear, but not that which is the subject of this application, since the angle of contact of the worm with all the teeth in the gear is greatly extended.

My invention contemplates a worm which is made in two parts, and when assembled, assumes a curved or concave form. In assembling the worm blanks before cutting the threads, a liner, or shim like a washer and preferably of laminated metal is interposed between the two parts, and the worm may be then cut or hobbed in a gear hobber or a like machine.

Another object of the invention, to wit, an adjustment of the worm, is achieved by the use of the shim, for one or more of its laminations may be removed to permit the two parts of the worm to be drawn closer together.

Another purpose of the invention is to provide for cutting the gear, a hob which is a modified duplicate of the worm. This modification is effected by the number of hob teeth engaged in cutting the gear. For example, a gear of small diameter and few teeth will necessitate a limited number of cutting teeth in the hob, while a gear of greater diameter and number of teeth will admit of a greater amount of hob, this amount being regulated by the necessity to prevent undercutting during the process of hobbing the gear.

In assembling the worm and gear, the gear is placed in position in its housing, and the worm, one part of which is keyed tightly to its shaft, is introduced. Being much larger at its end than it is at the center, the worm can then be screwed or threaded onto the gear until it seats itself.

The other part of the worm being fitted to rotate on the shaft, with the laminated shim in place between the parts, is then turned or threaded onto the gear until it is seated. This position brings the keyways in both the shaft and the worm in line, permitting the introduction of a key, to prevent further rotation of the worm independent of the shaft, but allowing longitudinal movement thereon to provide adjustment of the worm to overcome wear or compensate for errors of tolerance in production. This adjustment may be obtained by any suitable means, such as threaded bearings in the housing, at the ends of the worm, or by a nut threaded on the shaft and contacting with the movable part of the worm.

An extended form of this assembly may be constructed by locating two worms of this type on opposite sides of the gear. Then, by gearing these worms together in fixed relative position with each other, so that they will contact with every tooth in the gear, a condition of nearly perfect balance may be obtained and any undue angular thrust between any worm thread and gear tooth will be entirely eliminated.

Figure 2:
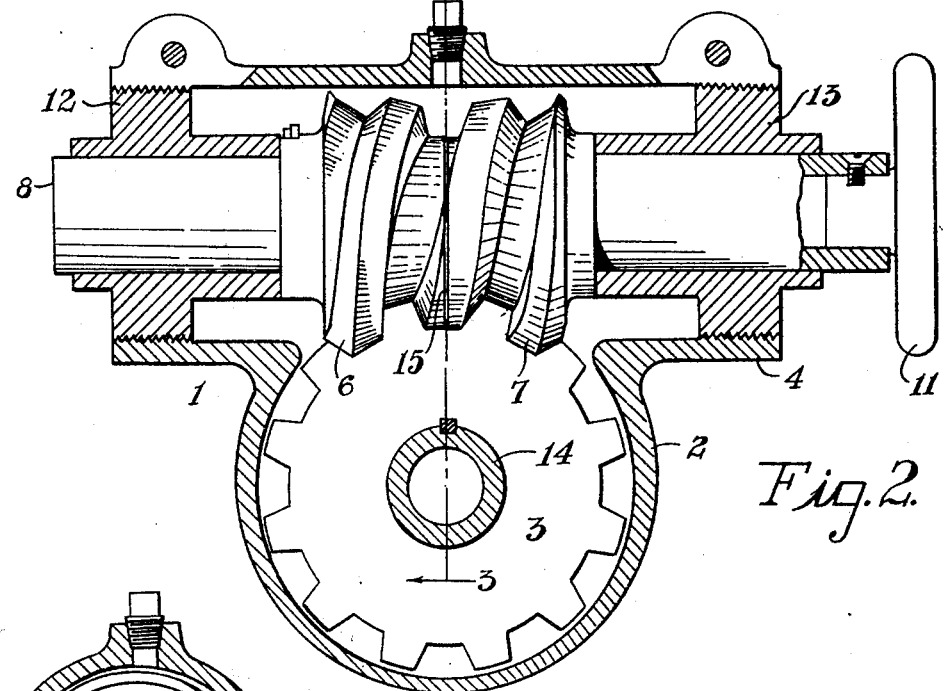
Figure 3:
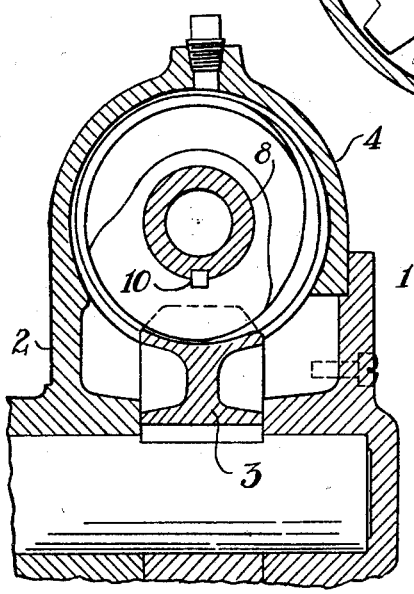
Figure 4:
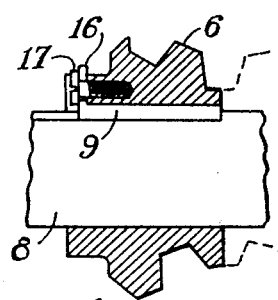

In the accompanying drawings illustrating my invention, Figure 1 is a side view of a worm shaft showing my two part worm in a separate position thereon. Figure 2 is a longitudinal sectional view taken through the housing, showing the gear and worm in engagement therein. Figure 3 is a sectional view taken through the device on the line 3—3 of Figure 2. And Figure 4 is a longitudinal sectional view taken through the rotatable worm part, showing the insertible key for causing it to rotate with the shaft.

Referring to the accompanying drawings for a detailed description of my invention, the numeral 1 designates a worm and gear housing which is preferably an aluminum casting. The latter is formed with a cylindrical portion 2 forming a housing for a gear 3 and a horizontal sleeve portion 4 acting as a casing for a worm 5. Engagement between the gear and worm is effected through a hole in the bottom part of the sleeve portion 4 of the casting. Each end of said sleeve portion is internally threaded.

The worm 5 is in two parts designated by the numerals 6 and 7, and when assembled on the worm shaft 8, they assume a curved or concave form.

The blanks for the worm parts are preferably made in duplicate, having a bore, with keyways formed therein to fit keys 9 and 10 on the shaft, so that they will turn with the shaft while free to be moved longitudinally along it.

The worm may be made in various modified forms. For example, one part may have the bore and keyway and the other part an extension upon which the female part may be fixedly mounted.

In the construction of the worm, the threads are generated by a cutter, or hob, that is a duplicate of the gear in diameter and form of tooth, so that the worm will contact with all the teeth in the gear through a greatly extended angle.

The worm may be cut, or hobbed, after the blanks are relatively assembled, by feeding the above described cutter or hob toward the axis, or center of the worm, both the worm and cutter having the proper relative motion and speed, until the desired depth of thread is reached.

In assembling the worm blanks before cutting the threads, a liner, or shim, like a washer, preferably of laminated metal is interposed between the two parts, and the worm may be then cut or hobbed, this operation being performed in a gear hobber or a like machine.

The hob or cutter used in cutting or generating the worm thread, moves in a plane parallel with, and in line with the worm axis, and with its cutting teeth entering consecutively the channel or groove it produces. Thus it is obvious that a worm may be generated, which will include a zone of tooth contact of approximately 180°, or any part thereof.

The purpose of the shim is to provide an adjustment of the worm, which is effected by removing one or more of the laminations of the shim and drawing the two parts of the worm closer together. This feature also eliminates the necessity of extremely close limits of tolerance in production. Any desired form of thread or tooth may be used, but a 20° pressure angle tooth is preferred.

The hob or cutter for generating the gear 3 is a modified duplicate of the worm, the modification being effected by the number of hob teeth engaged in cutting the gear. For example, a gear of small diameter and few teeth will necessitate a limited number of cutting teeth in the hob, while a gear of greater diameter and number of teeth will admit of a greater number of hob teeth, this number being regulated by the necessity of preventing undercutting during the process of hobbing the gear.

Fixedly secured to one end of the worm shaft 8 is a hand star wheel 11. Also mounted on this shaft, one on each side of the worm parts 6 and 7, are two bushings 12 and 13. Each of these bushings has an externally threaded rim so that it may be screwed into a respective end of the sleeve portion 4 of the casting. These bushings thus secured in the casting, form suitable bearings for the worm shaft.

In assembling the worm 5 and gear 3, the latter, on its shaft 14, is placed in proper position in the cylindrical position 2 of the casting, after which the worm shaft 8 is introduced. By this shaft, the worm part 7, which is fixedly secured to it by the key 10, is brought into engagement with the gear. The bushing 13 on the same end of the shaft is then screwed into the sleeve portion of the casting. Being much larger at its end than it is at the center, the worm part 7 can then be screwed or threaded onto the gear until it seats itself.

The other part 6 of the worm, with a laminated shim 15 in place between it and the fixed part 7, is then turned on the shaft into engagement with the gear until it seats itself. The key 9 is then inserted in the keyway formed in the worm part 6 and in the keyway formed in the shaft to prevent further rotation of the worm independent of the shaft. However, it allows a longitudinal movement of the worm part 6 thereon to provide an adjustment of it to overcome wear or compensate for errors of tolerance in production. The key 9 has formed at its outer end a flange 16 containing a hole to receive a screw 17 which enters a tapped hole in the worm part 6 to firmly secure the key to the latter. The bushing 12 is then screwed into the sleeve portion 4 of the casting, and by bearing against the worm part 6, will properly adjust it to the gear 3 to overcome wear or to compensate for errors of tolerance in production. Any other suitable means may be employed, if desired, to effect this adjustment.

The worm parts being mounted as described, upon the shaft 8, will contact with every tooth in the gear to obtain a condition of nearly perfect balance and thereby eliminate undue angular thrust between any worm thread and gear tooth. Its durability, ease of operation and means of adjustment well adapt my worm and gear to automobile steering and like mechanism.

I do not wish to be limited to the details of construction and arrangement herein shown and described, and any changes or modifications may be made therein within the spirit of the invention.

Having described my invention, I claim:

In a device of the type described, a housing having a gear receiving portion and a worm receiving sleeve portion internally threaded at each end, a gear mounted in said housing, a worm shaft in the sleeve portion of said housing, a two part worm on the worm shaft, in engagement with said gear, and a bushing on each end of the worm shaft, adapted to be screwed into its respective end of the threaded sleeve portion of the housing for engagement with a respective worm part.

In testimony whereof I have hereunto set my hand this 18 day of July, 1929.

JOSEPH N. KELLY.